(12) United States Patent
Wernersbach

(10) Patent No.: US 11,205,933 B1
(45) Date of Patent: Dec. 21, 2021

(54) MOTOR MADE FROM PRINTED CIRCUIT BOARDS

(71) Applicant: Glen C. Wernersbach, Cincinnati, OH (US)

(72) Inventor: Glen C. Wernersbach, Cincinnati, OH (US)

(*) Notice: Subject to any disclaimer, the term of this patent is extended or adjusted under 35 U.S.C. 154(b) by 126 days.

(21) Appl. No.: 16/572,881

(22) Filed: Sep. 17, 2019

(51) Int. Cl.
| | |
|---|---|
| *H02K 3/26* | (2006.01) |
| *H02K 21/14* | (2006.01) |
| *H02K 11/21* | (2016.01) |
| *H02K 11/33* | (2016.01) |
| *H02K 3/24* | (2006.01) |
| *H02K 41/03* | (2006.01) |
| *H02K 21/24* | (2006.01) |

(52) U.S. Cl.
CPC ............... *H02K 3/26* (2013.01); *H02K 3/24* (2013.01); *H02K 11/21* (2016.01); *H02K 11/33* (2016.01); *H02K 21/14* (2013.01); *H02K 41/031* (2013.01); *H02K 21/24* (2013.01); *H02K 2203/03* (2013.01)

(58) Field of Classification Search
CPC .......... H02K 11/33; H02K 21/24; H02K 3/26; H02K 2203/03; H02K 11/21; H02K 41/031; H02K 3/24; H02K 21/14
See application file for complete search history.

(56) References Cited

U.S. PATENT DOCUMENTS

| | | | | |
|---|---|---|---|---|
| 2011/0291532 | A1* | 12/2011 | Takeuchi | H02K 15/12 310/68 B |
| 2013/0278099 | A1* | 10/2013 | Komatsu | H02K 41/03 310/80 |
| 2015/0130332 | A1* | 5/2015 | Sakai | H02K 11/33 310/68 D |
| 2018/0287462 | A1* | 10/2018 | Kabune | H02K 11/21 |
| 2021/0023699 | A1* | 1/2021 | Darby | B25J 13/088 |

* cited by examiner

*Primary Examiner* — Michael C Zarroli

(74) *Attorney, Agent, or Firm* — Mark F. Smith; Smith Branden Burg Ltd.

(57) ABSTRACT

An electric motor comprising a reaction component having a plurality of directed magnets and a stator portion formed from one or more circuit boards having a plurality of conductive patterns and a mounting base for supporting the circuit boards in a perpendicularly aligned stacked position; wherein each conductive pattern has an opening for receiving an elongated rod extending through the opening in perpendicularly aligned conductive patterns and wherein each circuit board has at least one conductive terminal that electrically mates with the terminal end of another circuit board.

21 Claims, 12 Drawing Sheets

MOTOR MADE FROM PRINTED CIRCUIT BOARDS

BACKGROUND OF INVENTION

Electric motors have been around for hundreds of years. There have been many technology advances that have come about in the development of them. The basic premise with them is to use the interaction of electricity and magnetics to create mechanical motion. The earliest known motor dates back to the 1700s with most of the innovations happening between 1800-1900 producing rotary motor designs very similar to those in use today. There have been very few advancements to basic motor design in the 20th century with the exception of the linear motor and magnetic levitation.

The general design of a motor is to arrange copper wire in a coil either looped around just itself or around an iron core. This is called a pole. Electrical current is then run these coils at varying amps to repel or attract a magnet pole of a permanent or coil based magnetic field that is separated by a small air gap between the coil and the magnet. While it is possible to use a single coil or pole to create the designed movement of a magnet, it usually takes multiple coils and multiple magnets arranged in a desired way to achieve smooth continuous motion.

One of the early and most common rotary motor design was a brush-based motor. In a brush-based motor, the coils are mounted around a shaft that rotates (i.e. rotor) and the permanent magnets are stationary forming a circle around the spinning rotor but separated from it by a circular air gap. The number of coils, the thickness of the wire, and/or if they are wired in series or parallel can be changed to create different speed and force capabilities of the same size motor. If a coil is wired around an iron-based material center, the motor will generally produce more force. Electrical current is feed to the coils by wire brushes touching electronic contacts on the shaft that also are wired to the coils. As current is sent through the brushes, certain coils are energized causing shaft to rotate. The usual method to control to control speed is to increase of decrease the voltage applied to the brushes. Usually, an encoder reports the position or angle and is used to increase the control of speed and positioning.

With the advent of electronic and solid-state circuitry, the brushless rotary motor was developed. A brushless motor is the opposite mechanical arrangement of a brushed motor. The permanent magnet is attached a rotating shaft and multiple stationary coils are arranged around that rotating shaft encasing it. There is a small air gap between the rotating magnet shaft and the stationary coils encircling it. The ends of coil wires are attached to circuitry that turns on and off the electrical current running to them for a specific amount of time which can be used to vary the amps that the coil is charged. By changing the amps in each coil up and down in a specific pattern, the center permanent magnets are repelled and attracted causing them to rotate. The most common design is two have three coils increasing and decreasing by a sinusoidal wave amount with each coil 120 degrees off in the electric wave progression from the one next it. However, there are many specialize designs with 4, 6 or 8 or more coil poles per motor. Again, the number of coils, the thickness of the wire, or if they are wired in series or parallel can be changed to create different motion capabilities of the motor. Once again, a position encoder that reports the position or angle of a point on the rotary is use to increase the control of speed and positioning.

One of the latest technological developments in motor design has been the linear motor. A linear motor is made by having multiple coil windings one right after another in a line. These coil windings can be loops of coil by themselves or can be wrapped around an iron core for more force. An arrangement of permanent magnets is placed running parallel to the created multiple coil surface separated by an air gap usually kept constant by means of wheels running on rails mounted on the surface. By wiring each coil in a specific way such as together every third coil together and then energizing each third coil array sinusoidal wave offset by 120 degrees, the permanent magnet will be repelled and attracted to cause motion. There are linear motor versions where the permanent magnets are stationary and the coil assembly move and versions where the coils are stationary and the plate of magnets move. A linear position encoder running linear along the length of the track helps control position and speed.

A very recent improvement allowed multiple magnetic plates (movers) to run over the same linear coils surface for use in assembly lines in order to manufacture and to move product. This arrangement requires each coil along the linear length to be energized independently determined by when and where a permanent magnet mover is running over it. The location of each mover is always changing and controlled independently. An encoder system that can read the position of multiple magnetic movers on the same linear section is critical to managing this type of track.

There are also planar moving magnet motors which multiple coils are placed in both the x and y direction so the magnet plate can be driven in any direction.

Magnetic levitation is a more recent motor design. A maglev train uses a simplest form is a linear motor of a movable specially arranged permanent magnet array (Train) that running on top of many miles of wound coils (track). Because of the specific design of the magnet array, levitation and forward motion of the train is created when the coils in the track are energized.

The variations in motors and the coils within them are endless. The challenge is while the world has become more electronic and digital, the process of winding and wiring a coil in a given way in a motor is remains very mechanical and labor intensive. While there are automated machines that wind coils around in a loop or around iron cores, the connecting of the start and end leads of each coil in the correct way is problematic, labor intensive and error prone. It usually still takes some manual labor to wind a coil, mount it in a motor rig and wire it properly in an electrical array with other coils and to the electric current source. If the start and end wires are reverse in just one coil, the motor will not work properly. The more coils in one motor that a person has to connect, the more chance for error. For example, an 8-pole rotary motor has 16 wires that need to be connected in the right way so it will rotate properly. A 12-pole linear motor has 24 different wires that usually need to be connected each to a specific place for each coil to be individually energized. Any mistake in connection and the motor will not work. While it is fairly obvious for an assembly person to wire coils together in series fashion or a in parallel all to the same connectors, a combination of doing series and parallel wiring in the same design is generally too complicated to be human assembled. The need to wire things such as every third coil in a repeating fashion or independently properly to different connectors is very difficult to get right every time. This has caused motor manufacturers to favor simple motor designs that can be mechanically automated as much as possible and to move most of their motor manufacturing from developed economies having high labor costs to a country overseas with low cost labor. Thus, the labor component of wiring coils has reduced innovation in motor design.

Electronics in the form of printed circuits boards (PCBs) have been used in motors to function like encoders and for timed electronic switching (PWM Drive) circuitry which drive current into and out of the winded coils. A looping coil printed on a circuit board has been used for things like cell phone antennas. If a magnet is placed next to one of these printed circuit board coils, movement is created but with little pushing force because of the limited amount of copper in the form of circuit board traces that can be placed per square inch on a PCB's surface. Small pre-built rotary motors and pre-wounded coils have also been mounted to a printed circuit board. This surface mounted technology is generally used as a better choice to achieve some type of motion in conjunction with printed circuitry. One such printed circuit board motor uses an axial magnet field whereby rotor windings are printed, stamped or welded onto a disc shaped circuit board which rotates in the air gap between pairs of permanent magnets positioned around the periphery of the disk. The windings are places in a series of radial loops around the surface of the disk and surrounding magnets are arranged so that their north and south poles are alternated so that the magnetic fields in the air gaps of adjacent pairs are in opposite directions. The magnets are held in place by iron end caps to complete the magnetic circuit. Electric current is delivered to the windings, such as by brushes through metal commutator segments printed on the disc. One problem with such printed circuit board motors is that the coils often do not provide a sufficient magnetic field for certain operations. While multi layered printed circuit boards with coils printed on each layer have been developed to increase the magnetic field created, such designs increase the cost and complexity of the printed circuit board as well as increasing the cost and complexity of properly wiring all of the individual printed coils. Furthermore, such multi layered printed circuit boards are difficult to cool and often overheat in warm environments or during sustained use or high current operations.

It would therefore be desirable to have a motor that can be easily assembled with a minimal of manual labor thereby reducing the likelihood of wiring errors, that can be produced totally or primarily with robotic manufacturing systems thereby reducing the time and cost to manufacture, that provide an increase in the magnetic field produced by the coils without significantly increasing the complexity and manufacturing cost of the printed circuit board, and that can be easily modified for increasing the torque produced by the motor with a minimum of increase in size of the motor.

SUMMARY OF THE INVENTION

The subject invention is a new and novel electric motor that can be easily assembled with a minimal of manual labor and reduces the likelihood of wiring errors, that can be produced totally or primarily with robotic manufacturing systems thereby reducing the time and cost to manufacture, that provides an increase in the magnetic field produced by a motor formed by a circuit board without significantly increasing the complexity and manufacturing cost of the motor, and can be easily modified to increase the torque produced by the motor with a minimum of increase in size, complexity or manufacturing time.

In a preferred embodiment the electric motor of the subject invention comprises a reaction portion having a drive unit for driving a drive component and a rotor portion coupled to the drive unit and having a plurality of directed magnets; a stator portion formed from one or more circuit boards each having a first conductive surface with a plurality of conductive patterns and a second conductive surface with a plurality of conductive patterns that are perpendicularly aligned with corresponding conductive patterns of the first conductive surface; and a mounting base having a plurality of mounting supports for supporting the one or more circuit boards in a perpendicularly aligned stacked position with the mounting base; wherein each plurality of conductive patterns has an opening and an elongated rod extending through the opening in the perpendicularly aligned conductive patterns; wherein the elongated rods operate as magnetic flux bridges when the perpendicularly aligned conductive patterns are energized; wherein the elongated rods cooperate with the mounting bridge to create a magnetic flux circuit when the perpendicularly aligned conductive patterns are energized; and wherein the conductive patterns are positioned on the one or more circuit boards such that when the conductive patterns are energized and de-energized produces a magnet field that reacts with the directed magnets to move the drive unit, such as to rotate a drive shaft.

Another preferred embodiment the electric motor of the subject invention comprises a reaction portion having a drive unit for driving a drive component and a rotor component coupled to the drive unit and having a plurality of directed magnets; a stator portion formed from two or more circuit boards each having a first conductive surface with a plurality of conductive patterns wherein a conductive pattern on the conductive surface of one circuit board is perpendicularly aligned with a conductive pattern on the first conductive surface of a second circuit board; and a mounting base having a plurality of mounting supports for supporting the one or more circuit boards in a perpendicularly aligned stacked position with the mounting base; wherein each plurality of conductive patterns have an opening and an elongated rod extending through the opening in perpendicularly aligned conductive patterns; wherein the elongated rods operate as magnetic flux bridges when the perpendicularly aligned conductive patterns are energized; wherein the elongated rods cooperate with the mounting bridge to create a magnetic flux circuit when the perpendicularly aligned conductive patterns are energized; wherein each circuit board has at least one conductive terminal wherein the terminal end of one circuit board electrically mates with the terminal end of a second circuit board; wherein the conductive patterns are positioned on the two or more circuit boards such that energizing and de-energizing the conductive patterns produces a magnetic field that reacts with the directed magnets to move the drive unit, such as to rotate a drive shaft.

In another preferred embodiment of the invention the electric motor of the subject invention includes a reaction portion having a plurality of directed magnets and is coupled to a drive unit, such as a drive shaft, for driving a drive component, such as a rotating shaft or movable components; a stator portion formed from a first circuit board and a second circuit board each having a plurality of conductive patterns thereon. The first circuit board has at least one conductive terminal that operates to electrically mate with at least one conductive terminal of the second circuit board for electrically connecting the first circuit board with the second circuit board. At least one conductive terminal of the first circuit board and at least one conductive terminal of the second circuit board are electrically connected to at least one conductive pattern such that when the conductive pattern is energized and de-energized it produces a magnet field that reacts with the directed magnets to rotate the drive shaft. Preferable, the electric motor further includes one or more switches that operate to electronically connect the plurality of conductive patterns together in series or in parallel. The electric motor can further include a mounting base having a plurality of mounting supports for supporting the first and second circuit boards in a perpendicularly aligned stacked position with the mounting base such that the plurality of conductive patterns of the first circuit board is perpendicularly aligned with corresponding the plurality conductive patterns of the second circuit board. The perpendicularly aligned conductive patterns can each having an opening and an elongated rod extending through the opening and connected to a mounting base for creating a magnetic flux bridge.

In another preferred embodiment of the invention, the electric motor includes a reaction portion having one or more directed magnets that operate as a drive unit and are coupled to a drive component, such as movable component; and a stator portion formed from at least one circuit board having a plurality of conductive patterns. The conductive patterns operate to create a magnetic field and wherein the one or more directed magnets react to the magnetic field to move (drive) the movable component. The conductive patterns can be arranged along a track to move (drive) the movable components along the track. The conductive patterns can be arranged to move (drive) the movable component in x and y directions along a planar path. The electric motor can further include a mounting base and one or more elongated rods, wherein the conductive patterns are positioned on a first conducting surface and perpendicularly aligned conductive patterns are positioned on a second conducting surface of each circuit boards and wherein the mounting base and the one or more elongated rods cooperate together to create a magnetic field bridge when the perpendicularly aligned conductive patterns are energized. The electric motor can further include one or more switches that operate to electronically connect the conductive patterns in series or in parallel. Further, the elongated rods can be removably attached to the mounting base. The circuit boards can be printed circuit boards, wherein the conductive patterns are formed by etching, printing, stamping or welding.

In a preferred embodiment of the invention the mounting base is a formed from a ferrite material.

In another preferred embodiment the elongated rods are formed from a ferrite material.

In another preferred embodiment of the invention the electric motor has a plurality of individual circuit boards that are stacked one upon the other in a spaced relationship, wherein one or more of the circuit boards have one or more conductive patterns positioned on first and second surfaces of the circuit board.

In another preferred embodiment of the invention the electric motor includes a plurality of individual circuit boards that are stacked one upon the other in a spaced relationship, wherein one or more of the circuit boards have one or more conductive patterns electrically connected to a power source by one or more circuit traces on one or more of the individual circuit boards.

In another preferred embodiment of the invention the electric motor includes at least one printed circuit board having one or more conductive patterns positioned on a first surface of the circuit board and elongated rods extending through openings in the center of each one or more conductive patterns. Mounting supports extending through at least one printed circuit board are electrically connected to a start point and end point of each one or more conductive patterns to connect each one or more conductive patterns to a power source.

In another preferred embodiment of the invention the elongated rods are removably connected to a mounting base.

In another preferred embodiment of the invention the at least one circuit board is mounted to the mounting base such that the elongated rods align with openings in the center of each conductive pattern.

In another preferred embodiment the at least one circuit board has a plurality of holes that align with threaded holes in the mounting base for receiving threaded screws for attaching the at least one circuit board and the mounting base together such that the at least one circuit board is not in direct contact with the mounting base.

In another preferred embodiment of the invention the electric motor further comprises one or more switches that operate to electronically connect the conductive patterns in series or in parallel.

In another preferred embodiment the elongated rods are removably attached to the mounting base.

In another preferred embodiment the mounting supports are removable attached to said mounting base.

In another preferred embodiment one or more of the circuit boards are printed circuit boards wherein the conductive patterns are formed by etching, printing, stamping or welding.

In another preferred embodiment of the electric motor of the subject invention includes at least one circuit board having a first surface and a second surface and preferably at least one conductive pattern on the first and second surfaces. A perpendicularly aligned opening is positioned in the center of each conductive patterns and extends from the first surface to the second surface. A plurality of sheets each having ferrite material laminate printed thereon are stacked together to form an elongated rod is positioned within the perpendicularly aligned opening and cooperates with a mounting base to create a magnetic flux pathway.

In another preferred embodiment of the electric motor of the subject invention includes at least one circuit board formed from a plurality of layers and having a first surface and a second surface with at least one conductive pattern thereon, each layer includes at least one printed ferrite material laminate positioned such that it aligns with the center of the at least one conductive pattern and together cooperates with a ferrite material mounting base to form a magnetic flux pathway.

In another preferred embodiment two or more circuit boards are mounted to the mounting supports such that the circuit boards are separated by a spacing sufficient to provide air flow between the circuit boards sufficient to prevent or reduce heat buildup between the circuit boards.

In a preferred embodiment of the invention the conductive patterns are arranged for both parallel and series wiring.

In another preferred embodiment of the invention the conductive patterns are arranged in both x and y configuration (x and y directions) forming a planar motor.

In another preferred embodiment of the invention the conductive patterns are arranged in a circular configuration forming a rotary motor.

In another preferred embodiment of the invention a position encoder is mounted to each circuit board.

In another preferred embodiment of the invention a pulse width modulation system can be placed on the circuit boards for controlling the magnetic field energized in the conductive patterns providing controlled movement as the magnet moves from its positive to negative coil position relative to the centers of the conducting patterns.

A preferred embodiment of the invention is an electric motor comprising a mounting base having a plurality of mounting supports for supporting a plurality of printed circuit boards each having a top and bottom surface mounted to a mounting base. Each circuit board has one or more conductive patterns formed on the first and the second surfaces. Positioned within the center of each conductive pattern is an opening that is sized to receive an elongated rod that operates to guide the magnet field created by the one or more conductive patterns. Magnets are positioned in the magnetic vicinity of the center of each conductive pattern such that the in operation the position of the conductive pattern can change with respect to the magnets when electric current flows through the conductive pattern it passes through the magnetic field created by the magnet.

A preferred embodiment of the invention is a motor comprising a reaction component having a rotor component and a drive unit, such as a shaft, extending from the rotor component. The rotor component has a plurality of first magnets having their north poles positioned outwardly from the rotor component and a plurality of second magnets interleaved with the first magnets, wherein the second magnets having their south poles positioned outwardly from the rotor component; and a stator portion having at least on printed circuit board having a first conductive surface and an opposite second conductive surface, the first conductive surface having a plurality of conductive patterns thereon and the second conductive surface having a plurality of conductive patterns thereon such that the conductive patterns on the second conductive surface are perpendicularly aligned with corresponding conductive patterns on the first conductive surface; wherein the each conductive pattern has an opening positioned in the center of the conductive pattern; an elongated rod extends through each opening in perpendicularly aligned conductive patterns and are connected to a mounting base; wherein each conductive pattern has a start point and an end point the stator portion further includes electrically conductive terminals, wherein each conductive pattern has a start point electrically connected to a start conductive terminal and an end point electrically connected to an end conductive terminal, wherein the start conductive terminal electrically mates with the start conductive terminal of each perpendicularly aligned conductive patterns and the end conductive terminal electrically mates with the end conductive terminals of each perpendicularly aligned conductive patterns.

Various other objects, advantages, and embodiments of the invention will be apparent from the following description, the accompanying drawings, and the appended claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

The subject invention is a new and novel electric motor that can be easily assembled with a minimal of manual labor and reduces the likelihood of wiring errors, that can be produced totally or primarily with robotic manufacturing systems thereby reducing the time and cost to manufacture, that provides an increase in the magnetic field produced by the conductive patterns without significantly increasing the complexity and manufacturing cost of the motor, and can be easily modified for increasing the torque produced by the motor with a minimum of increase in size.

In the following detailed description reference is made to the accompanying drawings which are for the purpose if illustration and not intended to limit the described preferred embodiments of the invention. It is to be understood that other embodiments may be described herein and that various electrical and mechanical changes may be made without departing from the scope of the invention. As used herein the terms "perpendicular" or "perpendicularly" refer to the direction perpendicular to the first surface of a circuit board. As used hereon, the term "perpendicularly aligned" means that the aligned objects are positioned in a stacking relationship to each other such that a line perpendicular to the first surface of the circuit board can extend through the center of each aligned object.

Figure 1:
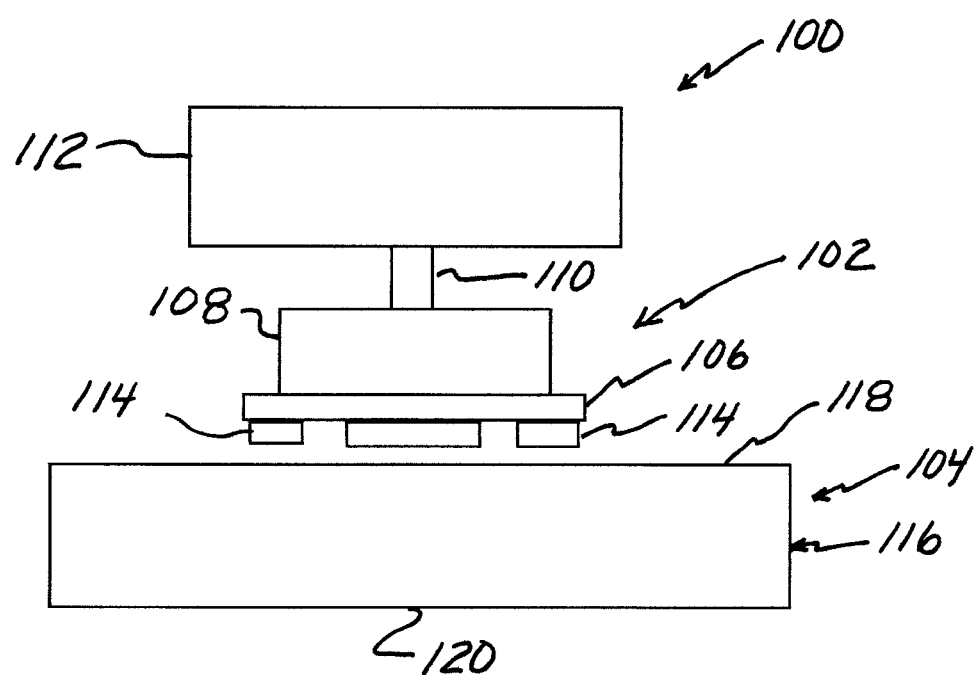
FIG. 1 is a side general schematic illustration view of a preferred embodiment of the electric motor of the subject invention showing a stator portion formed from at least one printed circuit board with one or more conductive patterns thereon and a reaction portion having a rotor component rotatably mounted to a rotor support and a drive unit, in the form of a shaft, operationally coupled to a drive component and a plurality of magnets positioned around the periphery of the rotor component for interacting with an magnetic flux created by the one or more conductive patterns.
Figure 2:
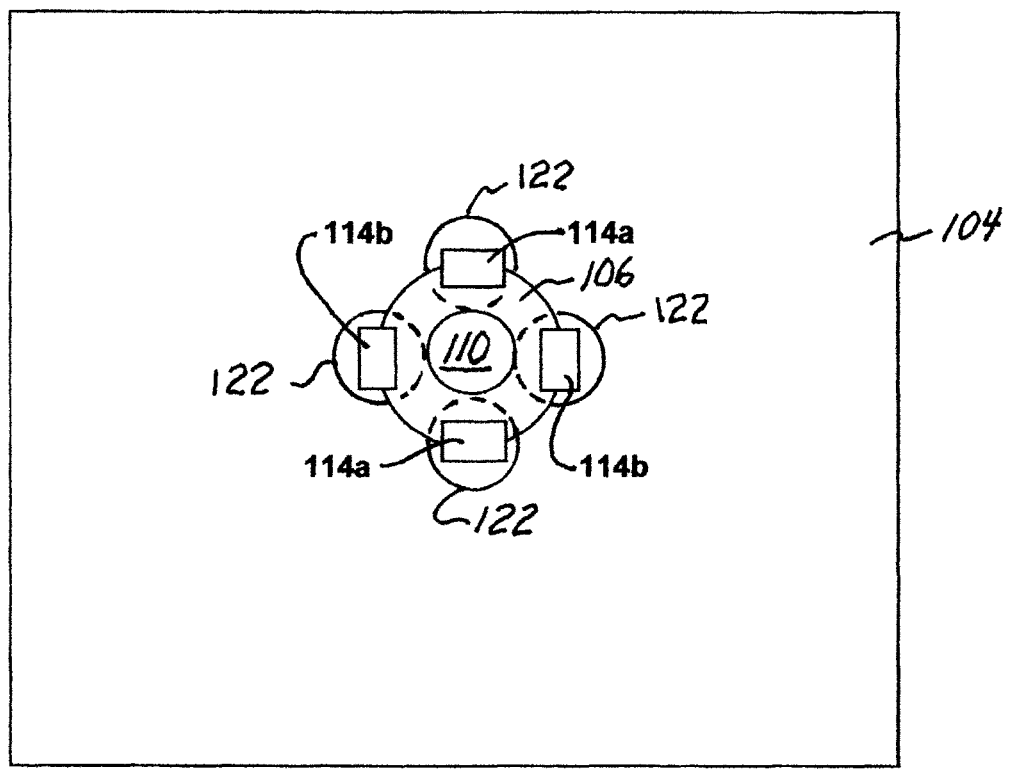
FIG. 2 is a top general schematic illustration view of the electric motor of FIG. 1 showing the stator portion formed from one or more printed circuit boards having a plurality of conductive patterns arranged in a circular pattern on the printed circuit boards and a reaction portion having a rotor component each having a plurality of magnets positioned around the periphery of the rotor component and a drive unit, in the form of a rotating shaft, coupled to the rotor portion whereby in operation the plurality of magnets interact with the magnet flux generated by the plurality of conductive patterns to drive the drive unit, such as rotating the shaft.

Electric Motor:

Referring to FIGS. 1 and 2, a schematic illustration of a preferred embodiment of the electric motor 100 of the subject invention is showing having a reaction portion 102 and a stator portion 104. The reaction portion 102 includes a rotor component 106 rotatably mounted to a rotor support 108. Extending from the rotor component is a drive unit 110 in the form of rotatable shaft, that is operationally coupled to a drive component 112 which is to be driven by the drive unit 110, such as by rotation of the drive shaft. Conventionally positioned around the periphery of the rotor component 106 are a plurality of directed magnets 114, wherein the directed magnets are aligned such that a plurality of first directed magnets 114a are positioned such that their north poles positioned outwardly from the rotor component 106 are interleaved with second directed magnets 114b having their south poles positioned outwardly away from the rotor component 106. The stator portion 104, as shown, includes a plurality of individual conductive patterns 122 positioned, such as in a circular pattern as shown, which when energized and de-energized produce an electric field that reacts with the directed magnets 114 to create rotational movement of the rotor component 106 for driving the drive unit 110, such as rotating the drive shaft.

Figure 3:
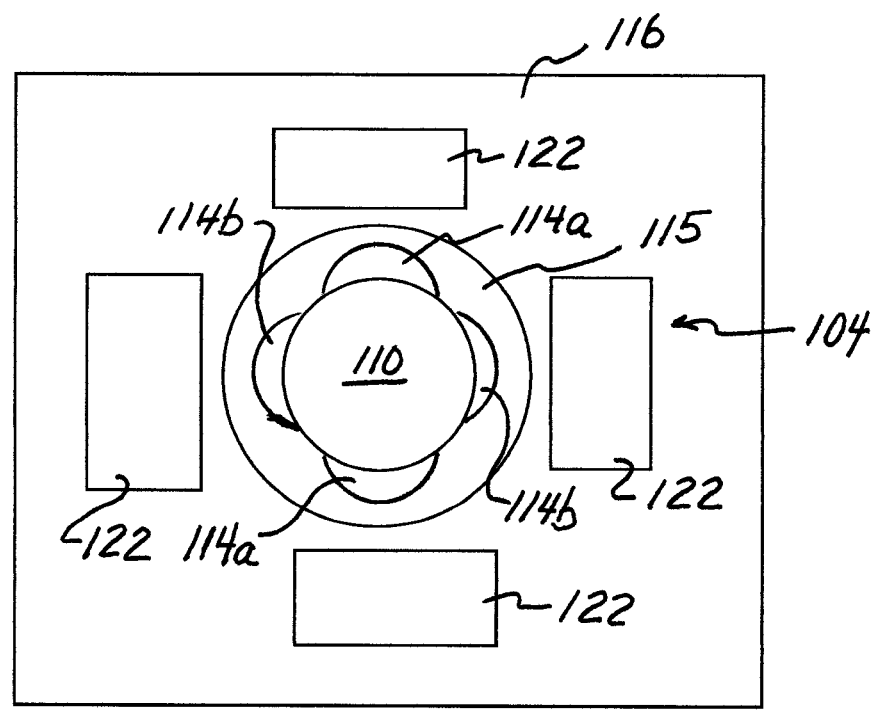
FIG. 3 is a top general schematic illustration view of the electric motor of another preferred embodiment of the electric motor of the subject invention showing the stator portion formed from one or more printed circuit boards having a stator opening and a plurality of conductive patterns arranged in a circular pattern around the periphery of the stator opening on the one or more printed circuit boards and the reaction portion showing a drive unit, such as a shaft, positioned within the opening such that the plurality of magnets positioned are within the opening such that in operation the plurality of magnets interact with the magnet flux generated by the plurality of conductive patterns to drive the drive unit, such as rotating the drive shaft.
Figure 4:
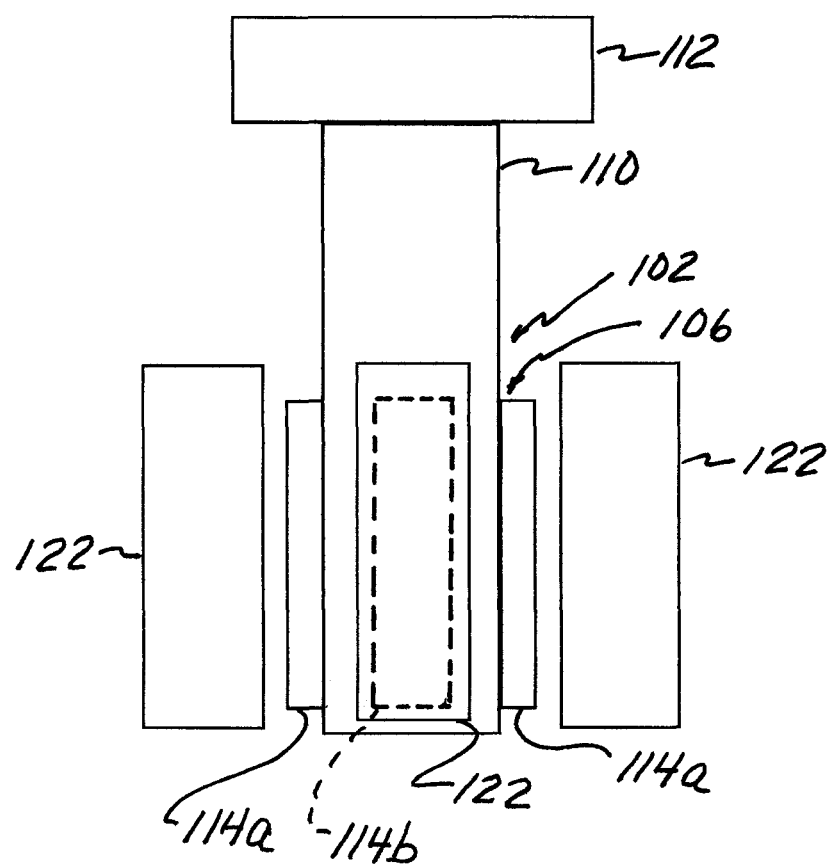
FIG. 4 is a side general schematic illustration view of the electric motor of FIG. 3 showing a reaction portion and a drive unit in the form of a shaft, supporting the rotor portion and operationally coupled to a drive component, the rotor portion includes a plurality of magnets positioned around the periphery of the drive unit (shaft) for interacting with an magnetic flux created by the one or more conductive patterns.

In another preferred embodiment of the invention, such as shown in in FIGS. 3 and 4, the stator portion 104 includes a drive opening 115 for receiving a drive unit 110, such as in the form of a rotatable drive shaft, and having conductive patterns 122 arranged in a circular configuration around the periphery of the drive opening 115. The reaction portion 102 includes one or more directed magnets 114 attached and arranged along a portion of the drive unit 110, such as the rotatable drive shaft, such that magnets 114a have their north poles facing away from the drive unit 110 (drive shaft) are interleaved with magnets 114b having their south poles facing away from the drive unit 110 (drive shaft). In operation, energizing and de-energizing of the conductive patterns 122 operate to create a magnetic field that reacts with the directed magnets 114 to drive the drive unit 110 (produce rotational movement of the drive shaft) thereby creating a brushless rotary electric motor. It should be understood that in another preferred embodiment, the stator portion 104 can be mounted to the drive unit (the rotatable drive shaft) and the directed magnets are mounted in a circular fashion around the drive opening 115 with their north and south poles interleaved around the drive unit (the rotatable drive shaft) to create a brushed rotary electric motor.

Figure 5:
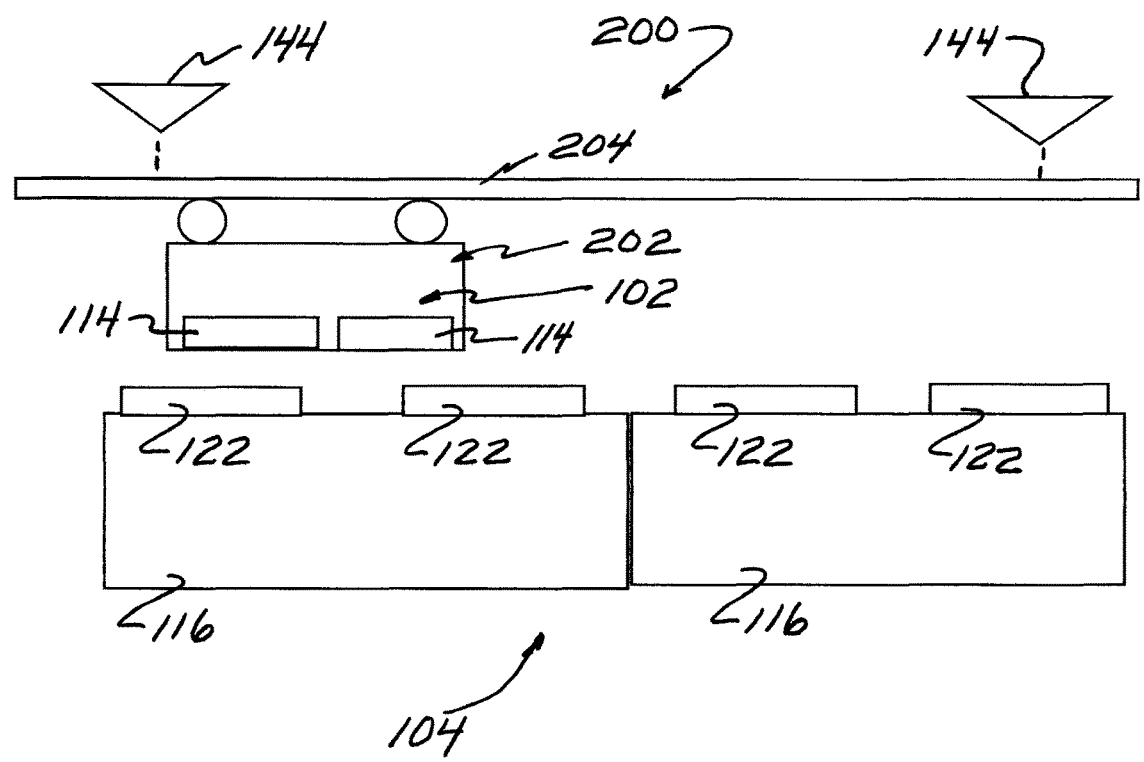
FIG. 5 is a schematic illustration of another preferred embodiment of the electric motor of the subject invention for use in a linear motion system for driving a movable component along a portion of a track whereby the movable component includes the reaction portion of the electric motor comprising one or more directed magnets that operate as a drive unit and the stator portion positioned along the track having a plurality of circuit boards each having a plurality of conductive patterns for interacting with the directed magnets for driving (moving) the movable component along the track.

In another preferred embodiment of the invention, as illustrated in FIG. 5, the electric motor of the subject invention operates in a linear controlled motion system 200 comprising one or more movable components 202 traveling along a track 204. It should be understood that the one or more movable components 202 can be movably attached to the track 204, such as by wheels or coasters as shown, or can levitate above (or below) the track 204. The electric motor of the subject invention includes a reaction portion 102 mounted to a movable component 202 and includes a plurality of directed magnets 114 that operate as a drive unit, by reacting to the magnetic flux created by the stator portion 104 mounted along the track 204. In operation, the stator portion 104 includes a plurality of conductive patterns 122 positioned along the track and operate such that when they are energized and de-energized in a predefined sequence they create magnetic fields that react with the directed magnets 114 on the movable component 202 to produce relative movement between the reaction portion 102 and stator portion 104 thereby driving the drive unit (directed magnets) to cause the one or more movable components 202 to move along the track 204.

Figure 6:
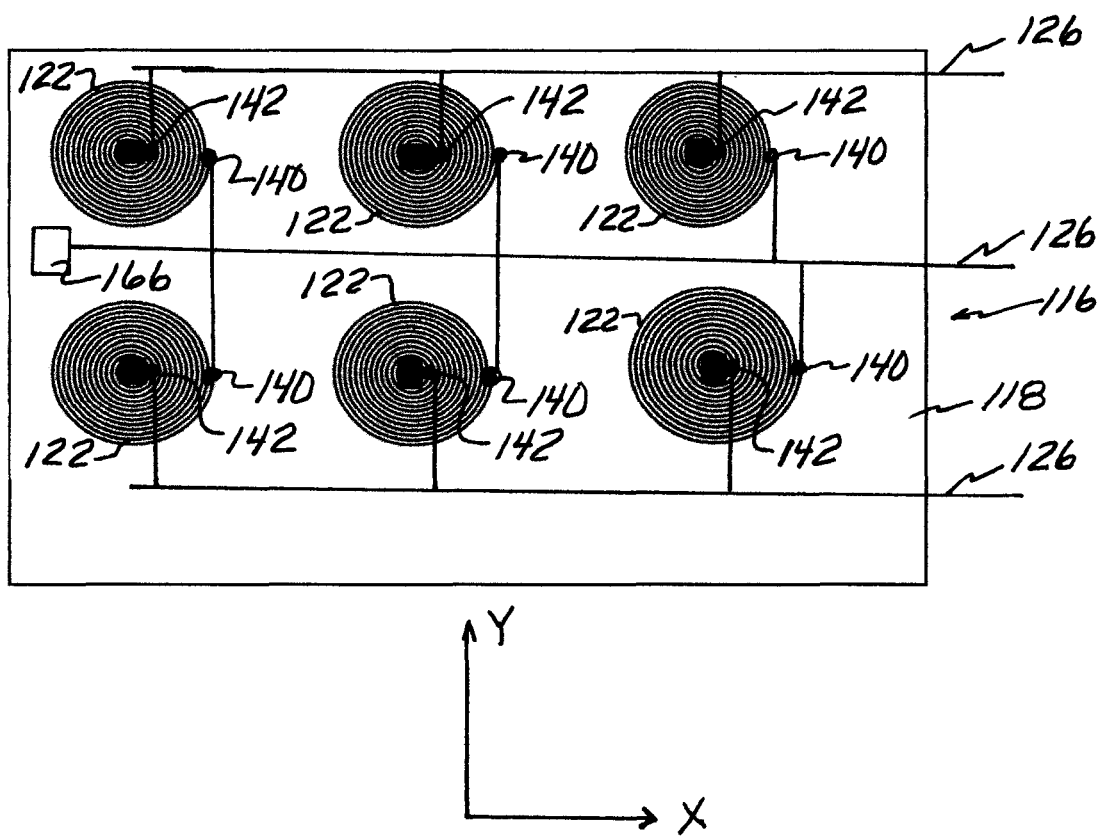
FIG. 6 is a top general schematic illustration view of a stator portion formed from a circuit board, such as printed circuit board, having a plurality of conductive patterns on at least one side of the printed circuit boards formed in both X and Y direction and electrically connected together in a series, parallel or combination thereof by electrical traces.
Figure 7:
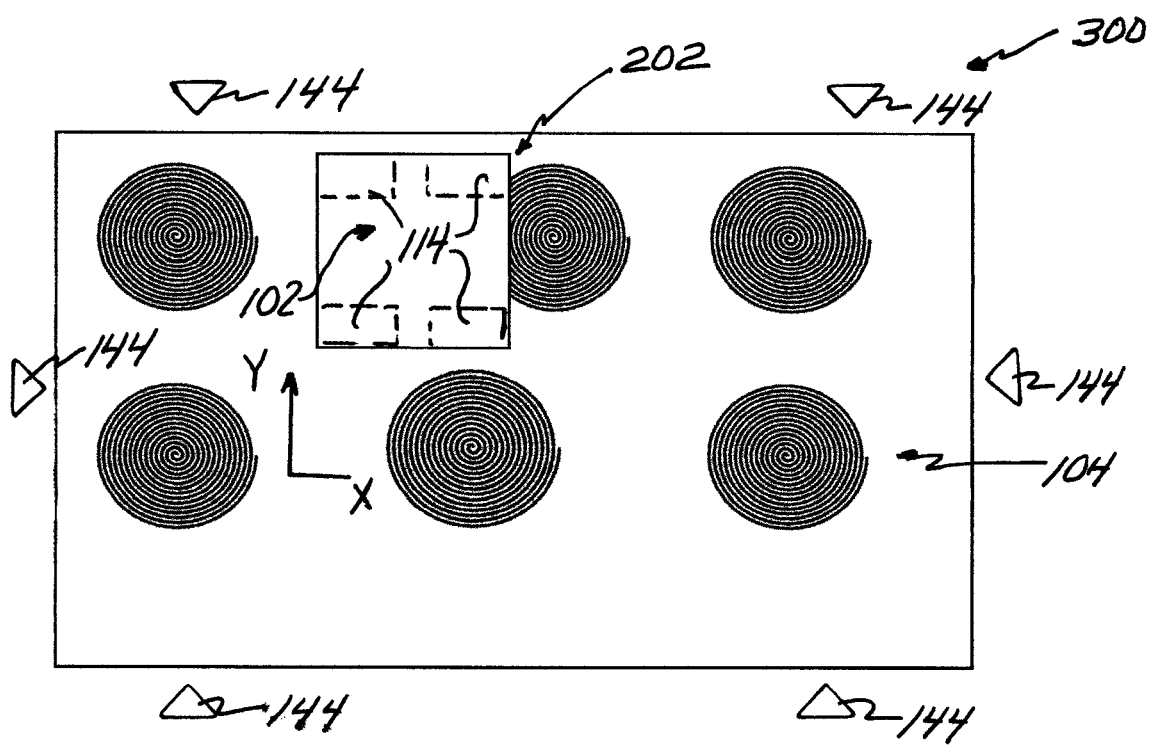
FIG. 7 is a top general schematic illustration of the electric motor for use in a planar motion system having a movable component with a reactive portion moving over the stator portion of FIG. 6 for driving and directing the movable component in an X or Y direction.

In another preferred embodiment of the invention, as shown in FIGS. 6 and 7, the electric motor for use in a planar controlled motor system 300 includes a stator portion 104 comprising a plurality of conductive patterns 122 preferably arranged in both the X and Y directions which cooperate with a reaction portion 102 mounted to a movable component 202. The reaction portion 102 includes a plurality of directed magnets 114 mounted in both X and Y directions that operate as a drive unit by reacting to the magnetic flux created by the conductive patterns 122 of the stator portion 104 to produce relative movement between the reaction portion 102 and the stator portion 104 when the conductive patterns 122 are energized and/or de-energized. It should be understood that by energizing the conductive patterns 122 of the stator portion 104 in a predetermined sequence allows the one or more movable components 202 to be driven (moved) in either an X or Y direction or a combination thereof (at a desired angle).

The electric motors of the subject invention, such as those described above, include a positioning system 144 (FIGS. 5 and 7) for determining the position of the directed magnets 114 on the reaction portion 102 for properly timing the energization and de-energization of the individual conductive patterns 122 of the stator portion 104. Such positioning system can be in the form of one or more encoders at one or more fixed positions such that they sense the position of the drive unit, such as the individual directed magnets 114. Such encoders are preferably "incremental absolute" position encoders that are coupled to a controller or counter on one or more of the reaction portions (or the stator portions as preferred) that operate by sensing and counting incremental pulses (or digitize sine/cosine signals to create these pulses) to count up or down after a directed magnet has traveled past a reference point. In a preferred embodiment the electric motor of the subject invention further comprises a conventional pulse width modulation system 166 (FIG. 6) for controlling the speed and/or torque of the electric motor thereby providing controlled movement of the reaction portion (or any component driven thereby) as said directed magnet moves from a positive to a negative conductive pattern position relative to the centers of the conducting patterns.

Stator Component

Figure 8:
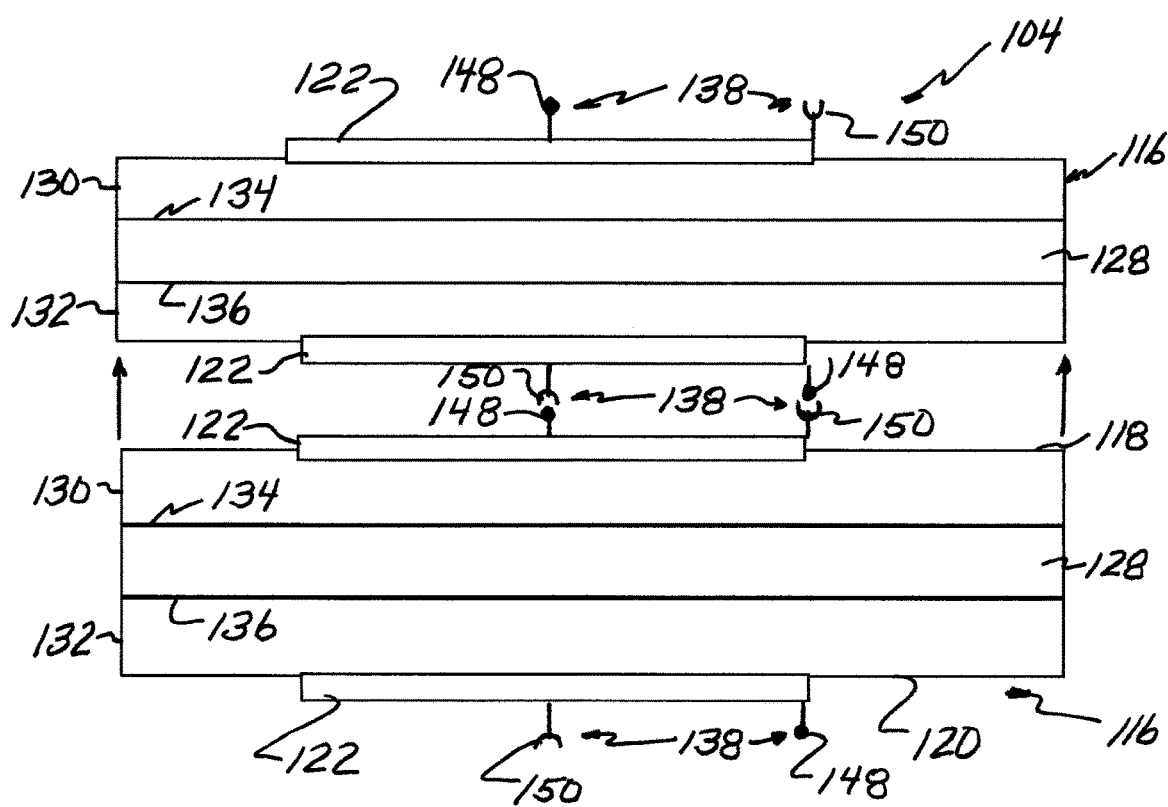
FIG. 8 is a side general schematic illustration view of a pair of printed circuit boards to be stacked one upon the other in a spaced relationship each having first and second conductive layers and a non-conductive substrate there between, illustrating the conductive patterns perpendicularly aligned and having conductive terminals in electric communication with the conductive patterns, either by direct contact or by a circuit tracing, wherein the conductive terminals operate such that a terminal end of one circuit board mates with the terminal end of a second circuit board.

Referring to FIGS. 6 and 8, the stator portion 104 of the electric motor 100 of the subject invention is illustrated preferably comprising at least one individual printed circuit board 116 having one or more layers each having a first surface 118 and an opposite second surface 120. The one or more circuit boards 116 of the subject invention can be created by any well-known method, and in a preferred embodiment have a non-conductive substrate 128 with a first conducting surface 130 bonded to a first non-conductive surface 134 and a second conducting surface 132 bonded to an opposed second non-conductive surface 136 of the non-conductive substrate 128. The first and second conducting surfaces 130, 132 are formed from a conducting metal, such as copper, silver and gold or an alloy thereof foil. The non-conducting substrate 128 is made from a material such as FR-4 glass epoxy, polyimide, epoxy resin, silicon or the like. It should be understood that other suitable materials typically used for circuit board construction can be utilized. It should also be understood that the circuit board can be single-sided (having one conductive surface), double-sided (two conductive surfaces on both sides of one non-conductive substrate) or multi-layer (multiple conductive surfaces alternating with non-conducting substrates) and preferably each conductive surface has one or more conductive patters thereon. Circuit traces 126, such as illustrated in FIG. 6, are conventionally formed, like the individual conductive patterns 122, such as by etching, printing, stamping or welding or other conventional means, along the first and second conducting surfaces and function as "wires" which conventionally connect the individual electric components on the circuit board together and also form the conductive patterns, such as in the form of coils, which together creates the stator portion of the electric motor. It should also be understood that the conductive patterns formed along the first and second conductive surfaces of the circuit board can have different geometries to allow for a higher density of copper to be placed on the circuit boards in areas between the magnetic poles. It should also be understood that the circuit traces can be formed along the first surface 118, the second surface 120 or any layers therebetween to connect the conductive patterns in any desirable manner, including connecting the conductive patterns in series or in parallel, or to connect or separate the conductive patterns in any desired configuration. Further, the conductive patterns can be connected to other components, such as timers and power sources, or control systems that are internal or external to the electric motor.

Single Printed Circuit Board

Figure 9:
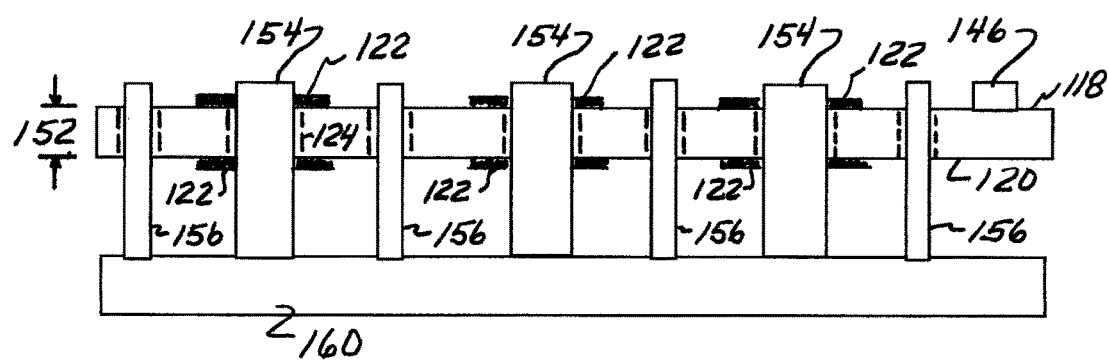
FIG. 9 is a side general schematic illustration view showing an individual printed circuit board having one or more conductive patterns one the first and second conductive layers and mounting supports extending through openings in the center of each of the one or more conductive patterns and a plurality of mounting supports for securing the printed circuit board to a mounting base and further showing a gap between perpendicularly aligned conductive patterns.

A preferred embodiment the electric motor of the subject invention is formed from a single circuit board. As illustrated in FIG. 9, one or more conductive patterns 122, such as in the form of copper coils, are positioned along the first surface 118 of the circuit board 116. In another preferred embodiment, one or more conductive patterns 122 are positioned along the first surface 118 and along the opposite second surface 120 of the circuit board 116 such as shown. In a preferred embodiment the circuit board can be conventionally formed in layers each layer having a plurality of conductive surfaces separated by a non-conductive substrate. Preferably, each conductive surface has one or more conductive patterns thereon that are perpendicularly aligned with corresponding conductive patterns on the other layers. Perpendicularly aligned conductive patterns operate to increase the magnetic fields generated that react with the reaction portion of the electric motor when the conductive patterns are energized and de-energized thereby causing relative movement of the reaction portion with respect to the stator portion of the electric motor.

As shown in FIG. 9, a non-magnetic gap 152 between the conductive patterns 122 on the first surface 118 of the circuit board 116 and the opposite perpendicularly aligned conductive patterns 122 of the second surface 120 of the circuit board 116 can operate to create corruption or change in the magnetic flux across the gap 152. This disruption or change in the magnetic field between the conductive patterns 122 caused by the gap 152 is problematic in that it leads to relatively large increase in resistance or cogging resulting in lost performance. Accordingly, as illustrated in FIG. 9, in a preferred embodiment, a ferromagnetic material, such as iron, in the form of a plurality of elongated rods 154 extend through each of the openings 124 and operate as magnetic cores that provide magnet flux bridges to permit the magnetic flux created by the conductive patterns positioned round the elongated rods to flow such that the magnetic field is substantially consistent through the gaps between the perpendicularly aligned conductive patterns. Thus, the use of such elongated rods operates to reduce disruption, changes or corruption of the magnetic field between the perpendicularly aligned conductive patterns 122 of the first and second surfaces 118, 120 of the circuit board 116 caused by the gap 152. It should be understood that different core materials for the elongated rods 154 may also be utilized to minimize the effects, such as eddy currents and hysteresis depending on the need. It should be understood that the size, such as the thickness, or the elongated rods is dependent on the particular ferromagnetic material forming the elongated rods and the strength of the magnetic field and should be sufficient to ensure that the magnetic flux is not saturating.

Two or More Stacked Circuit Boards

Figure 10:
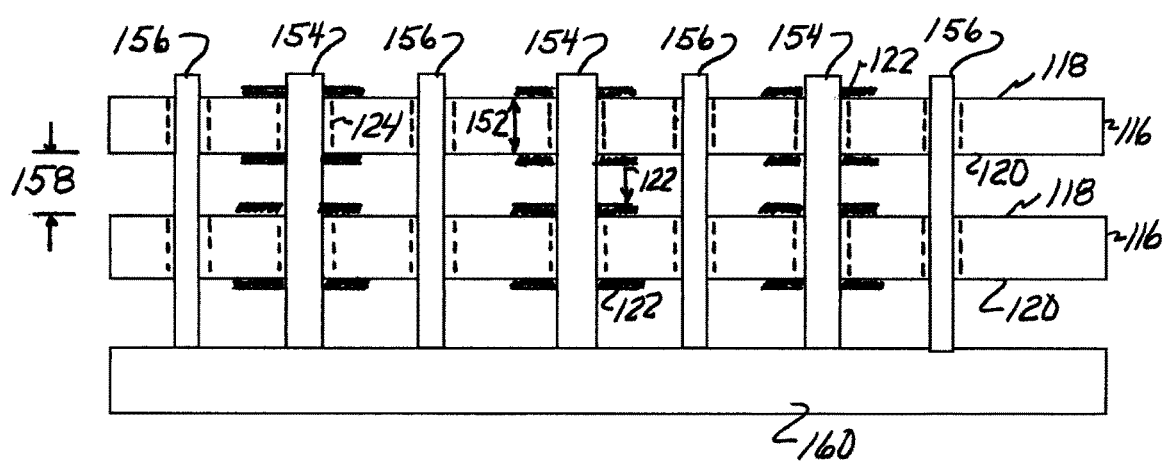
FIG. 10 is a side general schematic illustration view of another preferred embodiment of the stator portion of the electric motor of the subject invention showing two or more printed circuit boards stacked one upon the other in a spaced relationship, wherein one or more of the circuit boards have one or more conductive patterns positioned on each of their first and second surfaces.

As shown in FIG. 10, in another preferred embodiment of the invention two or more individual circuit boards 116 are stacked one upon the other in a spaced relationship and are held in position by a plurality of mounting supports 156. It should be understood that the two or more circuit boards 116 each have one or more conductive patterns 122 positioned on their first surfaces 118 or can have one or more conducive patterns positioned on both their first surfaces 118 and their second surfaces 120. As previously stated, it should also be understood that one or more of the circuit boards can be single-sided, double-sided or multi-layered and preferably each conductive surface has one or more conductive patterns thereon.

As illustrated, in a preferred embodiment two or more circuit boards 116 each having at least one conductive pattern 122, such as illustrated in FIG. 10, are stacked one upon the other in a spaced relationship such that the conductive patterns 122 are arranged perpendicularly aligned above each other such that the openings 124 formed in the centers of the perpendicularly aligned conductive patterns 122 are also aligned. The stacked circuit boards 116 are mounted on mounting supports 156 such that the circuit boards 116 are each separated by a spacing 158 that is sized to permit air to flow between the circuit boards to prevent or reduce heat buildup. It should be understood that the spacing is sized based on the location of the circuit boards, the amount of current and components being used in the circuit boards, and the environmental conditions that exist during use and other factors, such as the use of cooling systems (fans, cooling air, etc.). A gap 152 formed between the conductive pattern 122 on the first surface 118 of the circuit board 116 and the opposite perpendicularly aligned conductive pattern 122 of the second surface 120 of each stacked circuit boards 116 as well as by the spacing 158 between the stacked circuit boards can create corruption or change in the magnetic flux across the gap 152 and the spacing 158. This disruption or change in the magnetic field between the conductive patterns 122 caused by the gap 152 and spacing 158 is problematic in that it leads to lost performance. Accordingly, in a preferred embodiment, a ferromagnetic material, such as iron, in the form of a plurality of ferromagnetic material elongated rods 154 extend through each of the perpendicularly aligned openings 124 in each of the stacked circuit boards and operate as magnetic cores or magnetic bridges that increase the magnetic fields and allows the magnetic flux to flow with reduced disruption, changes or corruption of the magnetic field between the perpendicularly aligned conductive patterns 122 of the two or more stacked and aligned circuit boards 116. It should be understood that different core materials for the elongated rods 154 may be utilized to minimize the effects, such as eddy currents and hysteresis depending on the need. It should be understood that different core materials for the elongated rods 154 may also be utilized to minimize the effects, such as eddy currents and hysteresis depending on the need. It should also be understood that the size, such as the thickness, or the elongated rods is dependent on the particular ferromagnetic material forming the elongated rods and the strength of the magnetic field and should be sufficient to ensure that the magnetic flux is not saturating.

It should now be understood that the location of the mounting supports can be placed at different locations along the one or more circuit boards. For a non-limiting illustration, the mounting supports can be located at the corners or along the periphery of the circuit boards. In addition, in another preferred embodiment the mounting supports can be formed from a ferromagnetic material that further directs (act as magnetic bridges) the magnetic flux created by the conductive patterns as well as reducing the disturbance, change or corruption of the magnetic field. It should be understood that in a preferred embodiment of the invention the use of ferromagnetic material mounting supports can reduce or eliminate the need for the elongated rods in certain applications. It should also be understood that for certain applications, elongated rods may not be required and that other means can be utilized to separate the circuit boards. It should also be understood that in certain applications, the circuit boards and be attached together without a spacing between them.

Conductive Terminals

As illustrated in FIGS. 6 and 8, the circuit board 116 includes conductive terminals 138 that are formed from an electrically conducting material and are in electrical contact with the conductive patterns 122, such as directly connected to one or more of the conductive patterns or are connected to one or more conductive patterns by the circuit traces. In a preferred embodiment, as illustrated, each conductive pattern 122 has a start point 140 (start lead) in electrical contact with a circuit trace 126 by a conductive terminal 138 and an end point 142 (end lead) that is in electrical contact with a circuit trace 126 by a conductive terminal 138. In a preferred embodiment the conductive patterns are also in electrical contact with a third conductive terminal (ground lead) electrically in contact with a circuit trace that together operate to provide an electrical ground. The conductive terminals 138 are also electrically connected to an electrical power source (not shown), such as by a circuit trace for electrically energizing the individual conductive patterns. As described above, it should be understood that the circuit traces connecting the conductive terminals may be printed or placed on the first surface or the second surface (or any of the layers therebetween) of one or more of the printed circuit boards depending on the particular desired circuitry of the printed circuit board.

It should also be understood that in a preferred embodiment the electrically conductive terminals 138 can also be electrically connected to each other, such as in a series or a parallel configuration, by one or more circuit traces 126 printed or placed on one or more of the conductive surfaces (or layers) of the circuit board. For a non-limiting illustration, a first conductive circuit trace could connect some or all of the conductive terminals in a series configuration and a second conductive circuit trace could connect some or all of the conductive terminals in a parallel configuration. It should also be understood that the circuit traces can be formed along the first surface 118, the second surface 120 or any layers therebetween to connect the conductive patterns in any desirable manner, including connecting the conductive patterns in series or in parallel, or to connect or separate the conductive patterns in any desired configuration. Further, the conductive patterns can be connected to other components, such as timers and power sources, or control systems that are internal or external to the electric motor. In a preferred embodiment, one or more switches 146 (FIG. 9) can be electrically connected to the conductive circuit traces 126 so that a user (or a control system) can select between a series configuration or a parallel configuration or a combination of series and parallel configurations. It should be understood that the one or more electric switches can me placed at different locations and connected to different circuit traces such that the conductive patterns can be placed in a series configuration with each other or in a parallel configuration or a combination of both as desired. In another preferred embodiment the electrically conductive terminals 138 each extend through the first surface 118 and the non-conductive substrate 128 to the second surface 120 (as well as any layers therebetween).

Each conductive terminal extends slightly away from the first surface 118 forming a first terminal end 148, such as a male terminal connector, and slightly away from the second surface 120 and forms a second terminal end 150, such as a female terminal connector. As described more fully below, the use of perpendicularly aligned electrically conductive terminals permits a plurality of circuit boards to be easily, either manually or robotically, added or subtracted depending on the required torque of the electric motor. It should be understood that the conductive terminals can be connected to the conductive patterns in different desired arrangements. For example, the conductive terminals can be directly electrically connected to the various conductive patterns on one surface of the circuit board or can be indirectly electrically connected to various conductive patterns, such as by use of one or more circuit traces, or can extend through the circuit board to electrically connect perpendicularly aligned conductive patterns or can be electrically connected to conductive patterns on one or both surfaces of the circuit board (or conductive patterns formed within layers of a circuit board) as desired.

It should now be apparent to one skilled in the art that by the use of perpendicularly aligned electrically conductive terminals that electrically mate together allows a plurality of circuit boards to be aligned and stacked one upon the other and electrically connected together with a minimal of manual labor and can be easily assembled by use of robotics thereby reducing the cost and time of manufacture. Further, by perpendicularly aligning the electrically conductive terminals in an electrical mating relationship reduces or eliminates the likelihood of wiring errors. It should also now be apparent that a motor having a required amount of torque can be easily manufactured by increasing the number of circuit boards to increase the number of conductive patterns to provide an increase in the magnetic field produced by the conductive patterns without significantly increasing the complexity and manufacturing cost of the electric motor.

Figure 11:
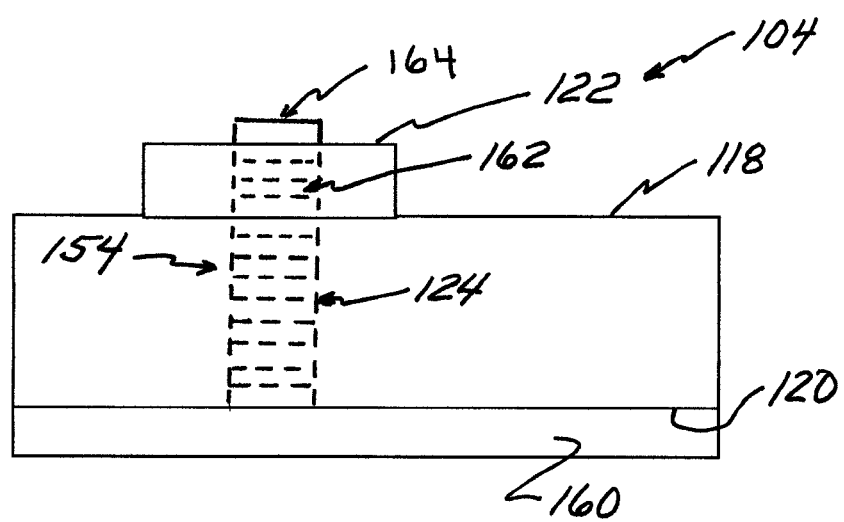
FIG. 11 is a side general schematic illustration view showing a printed circuit board having an elongated rod extending through an aligned opening in the circuit board and connected to a mounting base, the elongated rod is formed by a plurality of sheets.

Mounting Base:

As illustrated in FIGS. 9, 10 and 11, in a preferred embodiment of the invention, the stator portion 104 includes elongated rods 154 connected to or are integral with a mounting base 160. Preferably the mounting base 160 is sized to match the length and width of the individual circuit board(s) or at least one of the circuit boards 116 when a plurality of stacked circuit boards is selected. Preferably, the mounting base is formed from a ferromagnetic material and operates as a redirecting shield to redirect a portion of the magnetic field towards the reaction portion as well as cooperating with the elongated rods to create a magnetic flux circuit thereby increasing the torque produced by the electric motor. It should be understood that different core materials for the mounting base may also be utilized to minimize the effects, such as eddy currents and hysteresis depending on the need. It should be understood that the size, such as the thickness, or the mounting base is dependent on the particular ferromagnetic material forming the mounting base and the strength of the magnetic field and should be sufficient to ensure that the magnetic flux is not saturating. In a preferred embodiment, the mounting supports 156 and/or the elongated rods 154 are removably attached, such as by screwing or friction fit, to the mounting base 160. It should be understood that by removably attaching the mounting supports and/or elongated rods allows a user to replace the mounting supports and/or elongated rods with longer or shorter mounting rods and/or elongated rods to when the number (or thickness) of the circuit boards changes based on the size of motor required.

In another preferred embodiment, as illustrated in FIG. 11, the electric motor of the subject invention includes at least one circuit board 116 having a first surface 118, a second surface 120 with at least one conductive pattern 122 on the first surface 118. It should be understood, that the at least one conductive pattern 122 on the first surface can be perpendicularly aligned conductive pattern on the second surface. Extending from the first surface 118 to the second surface 120 and positioned in the center of each perpendicularly aligned conductive patterns 122 is an opening 124. A plurality of sheets 162 each having ferrite material laminate 164 printed thereon are stacked together to form elongated rods 154 that positioned within each perpendicularly aligned opening 124 and cooperate with a mounting base 160 to create a magnetic flux pathway.

Figure 12:
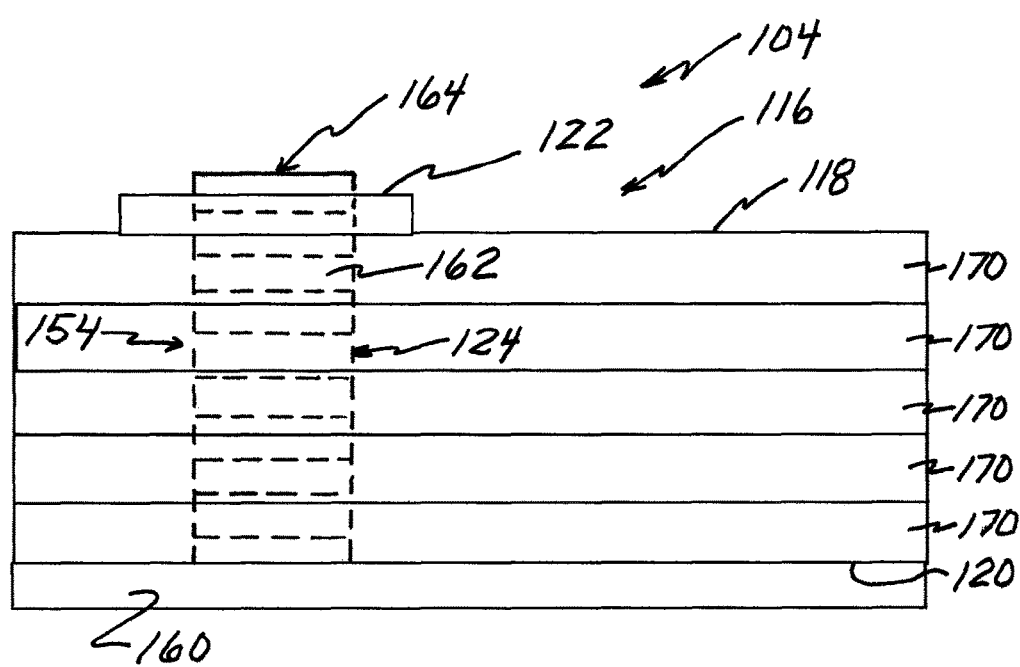
FIG. 12 is a schematic illustration of another preferred embodiment of the electric motor of the subject invention showing a circuit board formed by plurality of layers and having a first surface and a second surface with at least one conductive pattern thereon, each layer includes a printed ferrite material sheets positioned that such that they perpendicularly align with the center of the conductive patterns forming an elongated rod that together cooperates with a ferrite material mounting base to form a magnetic flux pathway.

In another preferred embodiment of the electric motor of the subject invention is illustrated in FIG. 12 and includes a stator portion 104 having at least one circuit board 116 formed from a plurality of layers 170 and having a first surface 118 and a second surface 120 with at least one conductive pattern 122 thereon. Each layer 170 includes an opening 124 that perpendicularly aligns with the center of the at least one conductive pattern 122. Positioned within the opening 124 is an elongated rod 154 formed of printed ferrite material sheets 162 each having ferrite material laminate 164 printed thereon stacked together and cooperate with a ferrite material mounting base 160 to form a magnetic flux pathway.

It should now be understood that the electric motor of the subject invention in a preferred embodiment includes a reaction portion having a plurality of directed magnets and is coupled to a drive unit for driving a drive component, such as a rotating shaft or movable components; a stator portion formed from a first circuit board and a second circuit board each having a plurality of conductive patterns thereon. The first circuit board has at least one conductive terminal that operates to electrically mate with at least one conductive terminal of the second circuit board for electrically connecting the first circuit board with the second circuit board. At least one conductive terminal of the first circuit board and at least one conductive terminal of the second circuit board are electrically connected to at least one conductive pattern such that when the conductive pattern is energized and de-energized it produces a magnet field that reacts with the directed magnets to drive the drive unit, such as by rotating a drive shaft. Preferable, the electric motor further includes one or more switches that operate to electronically connect the plurality of conductive patterns together in series or in parallel. In a preferred embodiment, the electric motor of further includes a mounting base having a plurality of mounting supports for supporting the first and second circuit boards in a perpendicularly aligned stacked position with the mounting base such that the plurality of conductive patterns of the first circuit board is perpendicularly aligned with corresponding the plurality conductive patterns of the second circuit board. In a preferred embodiment, the perpendicularly aligned conductive patterns each having an opening and an elongated rod extending through the opening and connected to a mounting base for creating a magnetic flux bridge.

In another preferred embodiment of the invention, the electric motor includes a reaction portion having one or more directed magnets coupled to a drive component, such as a movable component; and a stator portion formed from at least one circuit board having a plurality of conductive patterns. The conductive patterns operate to create a magnetic field and wherein the one or more directed magnets operate as a drive unit by reacting to the magnetic field to drive (move) the drive component. In a preferred embodiment the conductive patterns are arranged along a track. In another preferred embodiment the conductive patterns are arranged to drive the drive component, such as to drive (move) a movable component in x and y directions along a planar path. In another preferred embodiment the electric motor further includes a mounting base and one or more elongated rods, wherein the conductive patterns are positioned on a first conducting surface and perpendicularly aligned conductive patterns are positioned on a second conducting surface of each circuit boards and wherein the mounting base and the one or more elongated rods cooperate together to create a magnetic field bridge when the perpendicularly aligned conductive patterns are energized. In a preferred embodiment, the electric motor further includes one or more switches that operate to electronically connect the conductive patterns in series or in parallel. Further, in a preferred embodiment, the elongated rods are removably attached to the mounting base. It should also now be apparent that the circuit boards are preferably printed circuit boards, wherein the conductive patterns are formed by etching, printing, stamping or welding.

It should now be apparent to one skilled in the art that new and novel electric motor that can be easily assembled by stacking individual circuit boards one on top of another using the mounting supports such that the conductive terminals are aligned such that the first terminal end electrically mates with a perpendicularly aligned second terminal end of a perpendicularly aligned second circuit board. Thus, the number of circuit boards can be increased or decreased with a minimal of manual labor and reduces the likelihood of wiring errors. Further, it should now be apparent to one skilled in the art that the operation of stacking perpendicular aligned circuit boards as described can be produced totally or primarily with robotic manufacturing systems thereby reducing the time and cost to manufacture. In addition, by increasing the number of stacked circuit boards as described allows the ability to easily increase the magnetic field produced by the stator portion of the electric motor without significantly increasing the complexity and manufacturing cost of the motor and the electric motor can be easily modified to increase (or decrease) the torque produced by the motor while minimizing changes in size of the motor. It should also now be understood that the elongated rods operate as a magnetic lux bridge that operates to minimize the disturbance, change or corruption in the magnet flux caused by gaps between the conductive patterns. Further the use of a mounting base further operates to create a magnetic flux circuit that directs the magnetic flux thereby increasing the torque produced by the electric motor.

It should also now be apparent to one killed in the art that the use of removable mounting supports and elongated rods together with the use of electrically conductive terminals as described above allows robotic manufacturing of the electric motor and the robotic process can be easily changed to manufacture different size and power electric motors by simply adding or subtracting the number of stacked circuit boards. Further, the use of electrically mating conductive terminals reduces or eliminates the need to reprogram the robotic wiring procedures.

Preferred embodiments have been disclosed with a certain degree of particularity for the purpose of description, but not of limitation. Those skilled in the art will appreciate that numerous modifications and variations can be made to these embodiments without departing from the spirit and scope of the invention.

The invention claimed is:

1. An electric motor comprising:
   a reaction portion having a plurality of directed magnets and coupled to a drive unit;
   a stator portion formed from two or more circuit boards each removably mounted in spaced relationship to each other by mounting supports, wherein said each circuit board having at least one surface with a plurality of conductive patterns thereon;
   wherein said two or more circuit boards have at least one conductive terminal that operates to electrically mate with a at least one conductive terminal of another circuit board of said two or more circuit boards for electrically connecting said two or more circuit boards;
   wherein said plurality of conductive patterns are positioned on said at least one surface of said two or more circuit boards such that at least one or more of said plurality of conductive patterns on one of said two or more circuit boards are perpendicularly aligned with said conductive patterns on one or more of other said two or more circuit boards and operate to create a magnetic field when said perpendicularly aligned conductive patterns are energized; and
   wherein said magnet field reacts with said directed magnets to drive said drive unit for driving a drive component.

2. The electric motor of claim 1 wherein said drive unit is in the form of rotatable shaft.

3. The electric motor of claim 1 wherein said drive component is a movable component moving long a track and wherein said plurality of conductive patterns are arranged along said track.

4. The electric motor of claim 1 wherein said drive component is a movable component and wherein said plurality of conductive patterns are arranged such that said drive component travels in a X-Y plane.

5. The electric motor of claim 1 further comprising one or more switches that operate to electronically connect said plurality of conductive patterns together in series or in parallel.

6. The electric motor of claim 1 further comprising a mounting base
   wherein said perpendicularly aligned conductive patterns each having an opening and one of said one or more elongated rods extend through said opening and connected to said mounting base for creating a magnetic flux bridge.

7. An electric motor comprising:
   a reaction portion having one or more directed magnets coupled to a movable component that operates to move along a track;
   a stator portion formed from a plurality of circuit boards each having at least one surface with a plurality of conductive patterns thereon;
   wherein said plurality of circuit boards are electrically connected to energize and de-energize said conductive patterns operate such that said conductive patterns operate together to produce a magnetic field and wherein said one or more directed magnets react to the magnetic field to move said movable component along said track.

8. The electric motor of claim 7 wherein said conductive patterns are arranged along said track.

9. The electric motor of claim 7 wherein said conductive patterns are arranged to move said movable component in x and y directions along a planar path.

10. The electric motor of claim 7 further comprises a mounting base and one or more elongated rods and wherein one or more of said conductive patterns on said first circuit board is positioned perpendicularly aligned with one or more said conductive patterns on said second circuit board and wherein said mounting base and said one or more elongated rods cooperate together to create a magnetic field bridge when said perpendicularly aligned conductive patterns are energized.

11. The electric motor of claim 7 further comprising one or more switches that operate to electronically connect said conductive patterns in series or in parallel.

12. The electric motor of claim 10 wherein said one or more elongated rods are removably attached to said mounting base.

13. The electric motor of claim 7 wherein said one or more circuit boards are printed circuit boards wherein said conductive patterns are formed by etching, printing, stamping or welding.

14. The electric motor of claim 7 further comprises at least one position encoder to sense the position of said directed magnets as they travel along said track.

15. The electric motor of claim 7 further comprising a pulse width modulation system for controlling the magnetic field energized by said conductive patterns thereby providing controlled movement of said directed magnets.

16. An electric motor comprising:
a reaction component having a plurality of directed magnets;
a stator portion formed from a plurality of circuit boards each having a first conductive surface with a plurality of conductive patterns thereon, wherein said conductive patterns of one circuit board of said plurality of circuit boards are perpendicularly aligned with corresponding conductive patterns of all the other said plurality of circuit boards; and
a mounting base for supporting said plurality of circuit boards in a perpendicularly aligned stacked position;
wherein each said circuit board has at least one conductive terminal having a terminal end, wherein said terminal end of one circuit board electrically mates with the terminal end of another circuit board for electrically energizing said plurality of conductive patterns on each said circuit board;
wherein each said plurality of conductive patterns have an opening and an elongated rod extending through said opening; and
wherein said elongated rods cooperate with said mounting base operate to form magnetic flux bridges.

17. The electric motor of claim 16 wherein said plurality of circuit boards are positioned such that said circuit boards are separated by a spacing sufficient to provide air flow between said circuit boards sufficient to prevent or reduce heat buildup between said circuit boards.

18. The electric motor of claim 16 wherein said elongated rods are removably connected to said mounting base.

19. The electric motor of claim 16 further comprising one or more switches that operate to electronically connect said conductive patterns in series or in parallel.

20. The electric motor of claim 16 wherein said conductive patterns are arranged along a track.

21. The electric motor of claim 16 wherein said conductive patterns are arranged to move said movable component in x and y directions along a planar path.

* * * * *